Patented Dec. 22, 1942

2,306,136

UNITED STATES PATENT OFFICE 2,306,136

POLYMERIZATION OF UNSATURATED ALCOHOL DIESTERS OF OXALIC ACID

Irving E. Muskat, Akron, Ohio, assignor to Pittsburgh Plate Glass Company, Allegheny County, Pa., a corporation of Pennsylvania No Drawing. Application February 18, 1939, Serial No. 257,137

7 Claims. (Cl. 260—78)

This invention relates to the production of novel resinous products and to the methods of securing such products. In accordance with my invention, I have found that the polyesters of oxalic acid which are formed by esterification of the free acid groups of oxalic acid with unsaturated alcohols such as allyl alcohol, methallyl alcohol, oleyl, linoleyl alcohol, vinyl alcohol, ethylallyl alcohol, crotyl alcohol, propargyl alcohol, or the corresponding halo alcohols such as 2-chloro allyl alcohol or the chloro crotyl alcohols may be polymerized to form desirable products. Similarly, polymers may be secured from the mixed esters of oxalic acids such as vinylallyl-oxalate, vinyl-crotyl-oxalate, allyl-crotyl-oxalate, etc. The polymers which may be secured from these materials may be fusible and soluble in organic solvents or they may be infusible and insoluble. Thus it is found that upon polymerization of unsaturated oxalate esters, such as diallyl oxalate, a fusible polymer is formed initially. As polymerization proceeds, however, the material becomes substantially insoluble and infusible. If it is desired to recover the fusible polymer, polymerization must be interrupted before the polymer is converted into a gel.

In order to secure a product of maximum hardness and to facilitate more rapid and more complete polymerization, it is desirable to conduct the polymerization in two stages. In the first stage the monomer oxalate is polymerized as far as convenient without conversion to the infusible insoluble state. Such a polymer contains more or less residual monomer. While it may be further polymerized, the polymerization may occur slowly and the products obtained are often soft unless cured at excessively high temperatures for excessive periods of time. To secure a more completely polymerized, harder material in a comparatively short time, it is desirable to remove all or substantially all of the residual monomer from the fusible polymer. The polymer thus secured may be molded or shaped and may then be cured rapidly to the infusible state to form hard, clear, flexible resinous materials.

The polymer may be secured by subjecting the monomer to direct polymerization in the presence of suitable catalysts such as oxygen, ozone, peroxides, etc., by subjecting the monomer to the action of heat and/or light. In order to secure the fusible material, polymerization should be interrupted before the polymer is converted to an insoluble gel. Generally the polymerization is interrupted while the monomer-polymer mixture remains as a viscous solution.

Polymerization may be interrupted by cooling the polymerization mixture to room temperature or below or by introducing inhibitors such as pyrogallol, hydroquinone, aniline, phenylene diamine, sulphur, thiophenol, organic or inorganic salts or metal complexes of metals such as copper, cobalt, nickel, manganese, etc. In addition, polymerization may be interrupted by precipitating the polymer from the monomer solution by addition of a nonsolvent such as water or ethyl alcohol.

The fusible polymer may be recovered by preparing a monomer-polymer mixture in a solvent, such as acetone, and precipitating the polymer by addition of a nonsolvent such as water or methyl or ethyl alcohol. This polymer is found to be soluble in the usual solvents in which the usual thermoplastic vinylic polymers such as methyl methacrylate polymers are soluble. Suitable solvents for the fusible polymer are benzene, toluene, xylene, acetone, phenyl cellosolve acetate, chloroform, carbon tetrachloride, tetrachloroethylene, dichlorodiethyl ether, methyl cellosolve acetate, tetralin or mixtures thereof.

If desired, the unsaturated oxalates may be polymerized in solvents which are capable of dissolving the fusible polymer. In such a case, it is possible to obtain the fusible polymer by interrupting polymerization before the solution gels and generally while it is viscous. The polymer may then be recovered by distilling the solvent and unpolymerized monomer or by adding a nonsolvent such as water or ethyl or methyl alcohol to the solution thus precipitating the polymer.

The following examples are illustrative:

Example I 45 grams (0.5 mole) of anhydrous oxalic acid, 116 grams (2.0 moles) of allyl alcohol, and 3.2 grams of p-toluenesulfonic acid were heated together on an oil bath at 130–140° C., for 22 hours. The water and excess alcohol were then removed by slow distillation. The diallyl oxalate was then distilled at a temperature of 106–107° C. under a pressure of 6 mm. of mercury.

A sample containing 5% by weight of benzoyl peroxide was heated in a closed tube at 150° C. for 35 hours at which time the viscous solution was poured into methyl alcohol to recover the fusible polymer. The fusible polymer was heated in a mold with 5 percent benzoyl peroxide at a temperature of 150° C. for 3 hours and a flexible transparent sheet was produced.

Example II

A quantity of dimethallyl oxalate was heated with 2 percent benzoyl peroxide to a temperature of 165° C. for 2 days, after which the solution became viscous. The fusible polymer was recovered by dissolving the mixture in acetone and precipitating with methyl alcohol as in Example I. The polymer was soluble in acetone, dioxane, phenyl cellosolve acetate and xylene. Upon heating to 150° C. the polymer fused. A quantity of the polymer was placed in a mold and heated to 170° C. under a pressure of 1000 pounds per square inch for 4 hours and a hard, insoluble, brittle sheet was obtained.

Example III

A quantity of dioleyl oxalate was heated with 10 percent by weight of benzoyl peroxide to a temperature of 175° C. for 36 hours after which the solution became viscous. The soluble polymer was recovered as in Example I and was found to be fusible at 125–140° C. It was soluble in acetone, dioxane and phenylcellosolve acetate. A quantity of this polymer was molded and cured at 170° C. and a pressure of 1500 pounds per square inch for 6 hours. An insoluble flexible product was obtained.

The fusible polymers so produced have many characteristics which are similar to those of the polymers formed from the saturated acrylic acid esters. They are soluble in such organic solvents as acetone, dioxane, chloroform, ethyl cellosolve acetate, triacetin, phenylcellosolve, etc., and soften upon hetating. They are precipitated as a white amorphous powder from solutions by use of nonsolvents. The exact softening points of the products are dependent to a great degree upon the temperature, catalyst concentration and monomer concentration of the solution undergoing polymerization. In general, it is found that the chloro derivatives such as the polyesters of 2-chloro allyl alcohol soften at a temperature somewhat higher than the esters of the unsubstituted alcohols and at normal temperatures are somewhat harder and more dense. All of these products may be easily molded into convenient shapes.

The time required for polymerization to the fusible state is dependent upon the nature of the material, the catalyst concentration and the temperature of polymerization. In the case of the oxalate esters, polymerization in solution for a period of 30–40 hours is found to be satisfactory when the temperature is 160° C. This period must be materially lengthened with lower temperatures. However, an increase in the catalyst concentration decreases the time required for polymerization and when the catalyst concentration is sufficiently high, the fusible polymer may be obtained within a few hours after polymerization is initiated. In any case, however, the polymer should be recovered by interrupting polymerization as the monomer undergoing treatment grows viscous since after solidification thereof, the polymer is found to be substantially insoluble.

In accordance with my invention, I have found that upon subjection of these polymers to heating at temperatures somewhat above the softening point thereof, for a sufficient period of time, they are converted into infusible, insoluble, transparent, hard and wear-resistant products. Thus, while the fusible polymer melts or flows upon heating under nonpolymerizing conditions and at atmospheric pressure, the converted infusible polymer retains its shape or contour and does not flow under such conditions, and in general, can not be molded. Occasionally, an infusible polymer may soften slightly without deformation upon heating at atmospheric pressure but often the polymer decomposes without visible softening. The conversion appears to occur in the absence of catalysts. It may be assisted, however, by the incorporation of usual polymerization catalysts, such as oxygen, ozone, air, peroxides, such as hydrogen peroxide, or benzoyl peroxide, basic or acidic catalysts, light, etc., which promote the conversion of these products to the infusible state at lower temperatures. The application of super-atmospheric pressure has been found to assist the transformation to the insoluble and infusible stage.

The properties of the products so produced are dependent to a degree upon the conditions under which they were rendered infusible. Thus, extremely hard, somewhat brittle products may be prepared by effecting the treatment at relatively high temperatures or under high pressures. On the other hand, somewhat stronger, less brittle materials may be secured when the treatment is conducted under moderate pressures and temperatures which are sufficiently low to permit a slow conversion of the fusible polymer into its infusible stage through a period in which it is substantially completely molten.

By operation, in accordance with the present invention, it is thus possible to form a molded article from the fusible polymer such as the fusible polymeric diallyl or dimethallyl oxalate or other products previously referred to, and to render the molded product insoluble and infusible by heat. In this manner, I am able to prepare transparent, hard, infusible molded products which have many of the desirable properties of the conventionally known thermoplastic resins. By proper regulation of the pressure and temperature, the fusible polymer may be extruded under such conditions that it becomes infusible as it leaves the extrusion die.

A large number of inert substances may be incorporated with the fusible polymer before subjecting the molding condition. Suitable for such purposes are: fillers, such as wood-flour, mica, cotton flock, etc., plasticizers, such as dibutyl phthalate, dicyclohexyl phthalate, triacetin, tricresyl phosphate, natural and synthetic resins, pigments, including titanium dioxide, carbon black, chromic oxide, lead chromate, etc., and organic dyestuffs, such as methylene blue, methyl orange, etc.

If desired, similar products may be made from suitable copolymers of other vinylic polymers such as the saturated esters of acrylic or alpha-substituted acrylic acids, for example, the methyl and the ethyl esters thereof, or vinyl acetate, vinyl chloride, vinyl propionate, styrene, etc. In some cases, it is found that infusible products which are stronger and less brittle than the single polymer may be produced in this manner. This is particularly true when these materials are polymerized with a monohydric alcohol acrylate or alpha-substituted acrylate such as the methyl or ethyl ester of methacrylic or chloracrylic acid.

The polymers which I have prepared are capable of numerous uses such as in lacquers, or other coating compositions, molded articles, safety glass, etc. Where the composition is used for coating, it may be applied in solution or in solid form, either alone or in combination with natural or synthetic drying oils or resins and the like, the solvent removed and the coated article baked to render the surface infusible. In this manner, it is possible to surface other polymers which are less resistant to the action of solvents or of heat. When a coating of the fusible polymer of the diester of oxalic acid such as diallyl oxalate is deposited upon polymerized methyl methacrylate or similar polymer and the solvent removed, a coherent surface thereof is formed. Upon heating the coated article to suitable temperatures, the surface may be made transparent, hard, and infusible.

Being of the thermosetting type, these resins do not exhibit the phenomenon of "cold flow" and are thus especially desirable for such uses as airplane windshields, where the pressure differences have been found to bow thermoplastic glass substitutes, particularly at the higher altitudes. Coatings may be applied to metal, glass, wood, synthetic resins, etc., surfaces by extrusion of the heated fusible polymer directly on the suitably-prepared surface. In a similar manner, the surface may be heated and the polymer applied in powdered form, whereupon fusion occurs first to give a smooth homogeneous film which may be then heat-hardened.

These resins are also suitable for many uses in the field of laminated products. For example, products of great strength, elasticity and adherence may be secured by converting fusible diallyl or dimethallyl oxalate, etc., into the infusible state in the presence of a substantial amount of a compatible softening agent such as dibutyl phthalate, tricresyl phosphate, etc.

It has been found that these products are applicable for impregnation purposes. Thus, leather, paper, wood, or other comparatively porous substances may be steeped in a solution of the fusible polymer of diallyl dioxalate, for example, or a molten body thereof, and then heated alone, under pressure, or in the presence of catalysts to convert the absorbed polymer to the insoluble, infusible form. Greatly improved products, particularly in regard to strength, water-proofing, and electrical properties are obtained.

The process may also be extended to the production of mixed polymers or copolymers. Thus, the fusible polymer prepared in accordance with my invention may be mixed with other monomers or polymers such as the monomer or polymer of methyl methacrylate, methyl chloracrylate, vinyl acetate, vinyl chloride, styrene, etc., and the mixture subjected to conditions of polymerization. When the term "polyester" is employed in the specification or in the claims, it refers to the number of alcohol groups attached to the oxalate group, in contra-distinction to a polymerized ester.

Although the present invention has been described with reference to the specific details of certain embodiments thereof, it is not intended that such details shall be regarded as limitations upon the scope of the invention except insofar as included in the accompanying claims.

I claim:

1. In a method of preparing a substantially infusible insoluble polymer the steps which comprise polymerizing an unsaturated alcohol diester of oxalic acid, interrupting polymerization after substantial polymerization has occurred but before the polymer is converted to a gel, substantially completely separating residual monomer from the resulting fusible polymer before the polymer is polymerized to an infusible state, subjecting the resulting polymer to a temperature and pressure sufficient to insure the existence of the polymer in a fused state and continuing polymerization of the fused polymer for a time sufficient to convert the polymer into a substantially insoluble infusible state.

2. The process of claim 1 wherein the ester is diallyl oxalate.

3. The process of claim 1 wherein the ester is dimethallyl oxalate.

4. The process of claim 1 wherein the ester is dioleyl oxalate.

5. The process of claim 1 wherein the ester is polymerized in the presence of a polymerization inhibitor.

6. The process of claim 1 wherein the polymer is fused in the presence of a polymerization inhibitor.

7. In a method of preparing a substantially infusible insoluble polymer the steps which comprise polymerizing an unsaturated alcohol diester of oxalic acid, interrupting polymerization after substantial polymerization has occurred but before the polymer has been converted to a gel, substantially completely separating residual monomer from the resulting fusible polymer before the polymer is polymerized to an infusible state, subjecting the resulting polymer to a temperature and pressure sufficient to insure the existence of the polymer in a fused state and continuing polymerization of the fused polymer in the presence of a polymerization catalyst for a time sufficient to convert the polymer into a substantially insoluble infusible state.

IRVING E. MUSKAT.